June 14, 1927.
C. F. HOLMBOE
1,632,184
COOLING ARRANGEMENT FOR ELECTROLYTIC CELLS
Filed July 17, 1925
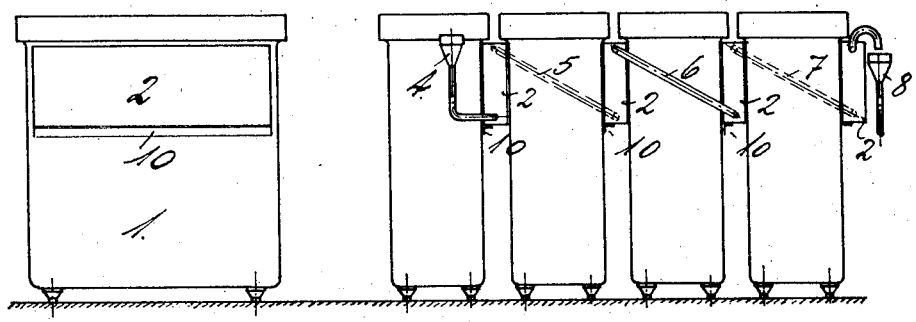

Patented June 14, 1927.

1,632,184

UNITED STATES PATENT OFFICE.

CARL FREDRIK HOLMBOE, OF OSLO, NORWAY, ASSIGNOR OF ONE-HALF TO DE NOR-DISKE FABRIKER, DE-NO-FA, A/S., OF OSLO, NORWAY.

COOLING ARRANGEMENT FOR ELECTROLYTIC CELLS.

Application filed July 17, 1925. Serial No. 44,202.

The efforts to develop electrolytic decomposition apparatus have had as a main object besides to increase the electrochemical efficiency also to reduce the dimensions of the apparatus as far as possible. The resulting compendious construction more especially in large apparatus involves that the joule energy loss $J^2R$ even with the highest attainable electro-chemical efficiency is so considerable that it cannot be given off by the normal natural radiation of the apparatus, in that the radiating surfaces are too small to give off the heat. If therefore artificial cooling of the apparatus is not provided for, the temperature in the rooms where the apparatus are situated will rise so high that the work in these rooms is made impossible. It has been attempted to avoid this drawback at least in part by air ventilation in the rooms but practice shows that such ventilation more especially in large rooms is not satisfactory.

Another way out of the difficulty would consist in making the rooms so large as to hold the radiation loss to each cubic meter of room space within reasonable limits but this again will involve a considerable increase in the cost of the plant.

According to the present invention these difficulties are avoided by simple means.

The invention is illustrated by way of examples in the annexed drawings.

In Figs. 1, 2 and 3 are shown a plurality of electrolytic cells arranged in a group and provided with cooling chambers connected to the same source of cooling liquid.

In order to maintain the electrolyte in the different cells at a suitable temperature, a cooling jacket 2 is arranged around each of the cells. The cooling medium is circulated through the series of cooling jackets surrounding the various cells and takes up the heat generated in the operation of the cells. By regulating the temperature of the liquid and rate of flow, as is well known in cooling practice, the temperature of the cells may be kept within suitable limits and efficient operation thereby insured.

In the particular arrangement shown in Figs. 1, 2 and 3, the cooling chambers 2 are constructed of thin plates and are supported in position around the outside of the separate cells by means of the projections 10.

Several cells can be cooled with the same liquid. In Figs. 1, 2 and 3 is shown the manner in which four cells are united by a common cooling system. The cooling liquid is first supplied to the bottom of the cooling box at 4 and flows through the connecting tubes 5, 6 and 7 and is discharged at 8. In cell systems, where the electrolyte casing partakes in the current conduction the cooling cases must be electrically insulated from the adjacent electrolyte case.

As cooling liquid may be used water, oil or other suitable liquid. When an oil for example is used as cooling liquid then this oil must be cooled by special means after having passed the cell or a number of cells. This is most conveniently attained by sucking the oil by means of a pump from the cells and forcing it through a cooling apparatus suitable for the purpose and passing it herefrom back to the electrolytical apparatus. By intercoupling a series of electrolyzing apparatus one and the same cooling apparatus or cooling system respectively can be used for a greater or less group of batteries.

The cooling jacket or cooling coils are preferably arranged around the upper half of an electrolyzer vessel. Hereby a natural circulation of the electrolyte is attained in that the cooled electrolyte nearest to the cooling surface descends in the vessel along its walls and effects a circulating motion of the electrolyte which facilitates cooling.

Claim:

In an electrolytic apparatus comprising a plurality of electrolytic vessels placed in flow-path relation to one another, and detachably mounted containers for a cooling liquid placed between the electrolytic vessels and in close proximity to at least two of said vessels, the containers for cooling liquid being connected in groups and being connected to the same source of cooling liquid.

In testimony that I claim the foregoing as my invention, I have signed my name.

CARL FREDRIK HOLMBOE.